US008819442B1

(12) United States Patent
Gehrig et al.

(10) Patent No.: US 8,819,442 B1
(45) Date of Patent: Aug. 26, 2014

(54) ASSESSING RISK ASSOCIATED WITH A COMPUTER TECHNOLOGY

(75) Inventors: Jeffrey Ronald Gehrig, Highland Park, IL (US); Philip Howard Quinlan, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 960 days.

(21) Appl. No.: 12/479,958

(22) Filed: Jun. 8, 2009

(51) Int. Cl.
*G06F 15/16* (2006.01)

(52) U.S. Cl.
USPC ........... 713/180; 713/185; 713/188; 713/189; 726/1; 726/4; 726/22; 726/25

(58) Field of Classification Search
USPC ............ 713/180, 185, 189; 726/1, 22, 25, 23, 726/26
See application file for complete search history.

(56) References Cited

U.S. PATENT DOCUMENTS

| | | | | |
|---|---|---|---|---|
| 6,618,721 | B1 * | 9/2003 | Lee | 726/26 |
| 7,748,038 | B2 * | 6/2010 | Olivier et al. | 726/24 |
| 7,996,895 | B2 * | 8/2011 | Chen et al. | 726/22 |
| 2002/0199122 | A1 * | 12/2002 | Davis et al. | 713/201 |
| 2003/0140250 | A1 * | 7/2003 | Taninaka et al. | 713/201 |
| 2006/0075503 | A1 * | 4/2006 | Bunker et al. | 726/25 |
| 2009/0271863 | A1 * | 10/2009 | Govindavajhala et al. | 726/23 |

OTHER PUBLICATIONS https://www.owasp.org/images/e/e8/OWASP_Top_10_2007.pdf "OWASP Top 10"—OWASP, Nov. 2007.*

* cited by examiner

*Primary Examiner* — Randy Scott
(74) *Attorney, Agent, or Firm* — Banner & Witcoff, Ltd.; Michael A. Springs (57) ABSTRACT

Systems and methods of assessing vulnerability or risk associated with a computer technology are presented. The system and method may include receiving a listing of vulnerability occurrences associated with the computer technology and determining a severity of each of the vulnerability occurrences. The number of occurrences and severity may be combined to determine a vulnerability security score which provides an objective measure of the risk or vulnerability of the computer technology based on historical data. The vulnerability security score may then be used to make risk based decisions regarding implementation of the computer technology, elimination of use of the technology, and the like.

21 Claims, 9 Drawing Sheets

ASSESSING RISK ASSOCIATED WITH A COMPUTER TECHNOLOGY

BACKGROUND

Computer technologies and software are an integral part of virtually every business operating today. Consistent and reliable functionality of software used by companies is one aspect to maintaining a successful business. However, computer software is rarely without flaw. Each piece of software, hardware, and the like is prone to malfunction. A determination of the risk or vulnerability associated with the computer technology is helpful in determining which software to implement, which to eliminate, and the like.

In current business organizations, risk associated with software is subjectively determined by an individual assessing one or more computer technologies. This risk assessment process is not only time-consuming and inefficient, it also leaves a considerable amount of variability between assessments since each individual making the assessment uses different criteria, different weighting assignments, and the like. Accordingly, it is difficult to compare risk associated with computer technologies for which risk assessments have been made by different individuals. An objective system and method for assessing risk would thus be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to systems and methods for assessing risk or vulnerability associated with a computer technology. The systems and methods may include identifying a plurality of vulnerability occurrences associated with the computer technology and determining a number of vulnerability occurrences associated with the computer technology over a predetermined period of time. The systems and methods further may include determining a severity of each of the identified vulnerability occurrences associated with the computer technology and combining the determined number of vulnerability occurrences with the determined severity to determine a vulnerability security score for the computer technology.

Aspects of the disclosure further relate to methods that may include receiving a listing of vulnerability occurrences associated with the computer technology and assigning a weighted value to each of the determined vulnerability occurrences to determine a weighted vulnerability occurrence score. The methods further may include determining a severity of each of the vulnerability occurrences associated with the computer technology. The methods further may include combining the determined severity with the weighted vulnerability occurrence score for each vulnerability occurrence and determining a vulnerability security score for the computer technology based on the combined determined severity and weighted vulnerability occurrence score.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to systems and methods for assessing risk and/or vulnerability of various computer technologies. The computer technologies may include software, such as different versions of the same software, software providing similar functionality but developed by different developers, software having different functionality but all developed by the same developer, as well as hardware, and the like. A vulnerability security risk score may be determined for each assessed computer technology based on the historical vulnerability occurrences and the severity of those occurrences. This vulnerability security score provides an objective measure of vulnerability for a given computer technology and may be used to forecast future risk associated with the computer technology. Although the system and method described herein may be implemented using various computing environments and computer-based methods, in some arrangements, the system and method of aggregating vulnerabilities for a particular computer technology over a predetermined period and comparing those results to other computer technologies in order to make decisions regarding the technologies may also be implemented without the use of a computing environment.

Figure 1:
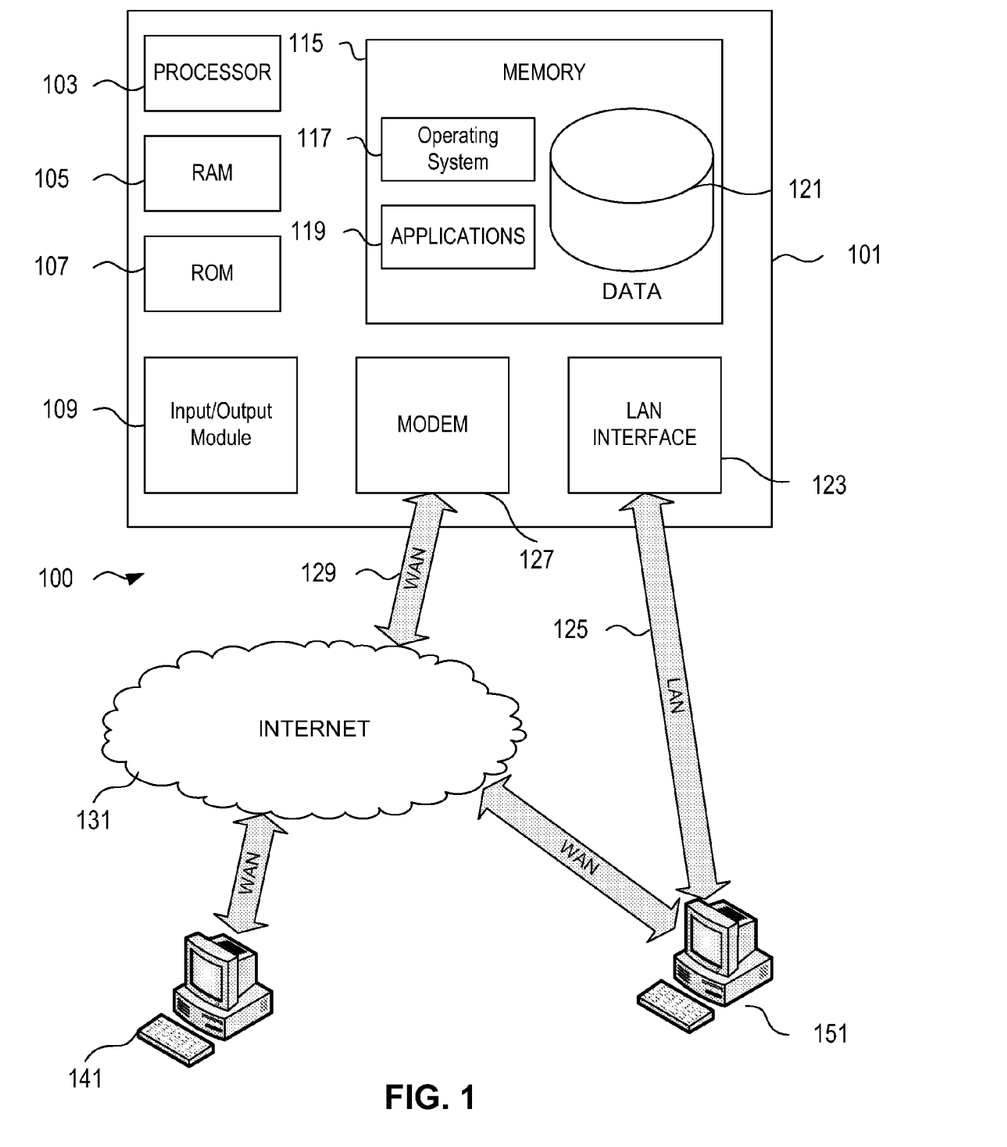
FIG. 1 illustrates an example of a suitable operating environment in which various aspects of the disclosure may be used.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to reward programs, redemption of reward credits, and the like, as further described herein.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
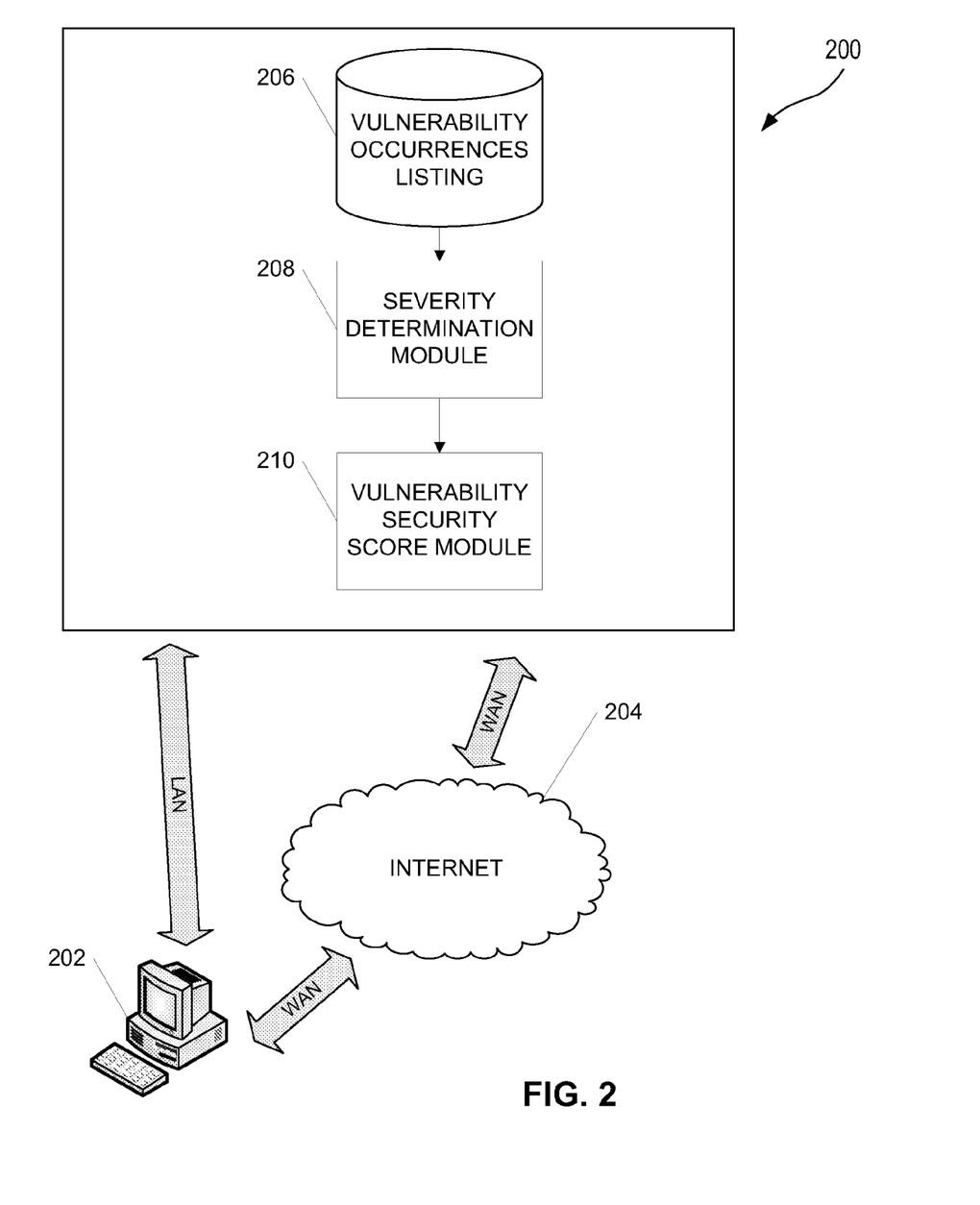
FIG. 2 illustrates a simplified diagram of a vulnerability assessment system in accordance with aspects described herein.

FIG. 2 illustrates one example computing environment 200 in which a system and method of analyzing vulnerability described herein may be used. The components and modules described in the Figure may include firmware, hardware, software and/or combinations thereof. The vulnerability risk assessment system 200 may include one or more databases 206 storing vulnerability occurrences for one or more computer technologies. In some arrangements, the vulnerability occurrences may be obtained from an outside source and downloaded to the storage medium 206 provided in environment 200. In other arrangements, the vulnerability occurrences database 206 may include vulnerability occurrences that have been tracked by the vulnerability assessment system 200 and stored in the database 206. As used herein, a vulnerability occurrence may be any malfunction or function affecting issue associated with the computer technology. In some arrangements, a vulnerability occurrence or security vulnerability may be a mistake in software that can be directly used by an unauthorized individual to gain access to a system or network. A vulnerability occurrence may be a state in a computing system or set of systems that may allow an attacker to execute commands as another user, access data that is contrary to the specified access restrictions for that date, pose as another entity, and/or conduct a denial of service. Vulnerability occurrences may include such vulnerabilities as: error page cross cite scripting vulnerability, sandbox security bypass vulnerability, phf (remote command execution as user "nobody"), rpc.ttdbserverd (remote command execution as root), world-writeable password file (modification of system-critical data), default password (remote command execution or other access), denial of service problems that allow an attacker to cause a blue screen of death, smurf (denial of service by flooding a network), and the like.

The vulnerability occurrences used with the system and method described herein may include vulnerabilities experienced by one or more users or may be a collection of some or all vulnerabilities experienced by a majority or all users. The vulnerabilities may be obtained for a predetermined time period and may include all vulnerabilities experienced over the lifetime of the product. In still other arrangements, the vulnerability may not have been experienced by any users. That is, the vulnerability may have been identified prior to it causing any disruption to service.

The vulnerability risk assessment system 200 may also include a severity determination module 208. This module 208 may assign a severity to each vulnerability occurrence stored in the one or more databases 206. The criteria used for assigning severity may be determined by a user, for example, via a user interface 202. The user interface 202 may connect to the vulnerability assessment system 200 via a network 204, such as the Internet. A user may input the desired criteria for determining severity, and/or a scale of values, e.g., 1 to 10, 1 to 3, and the like, that will be assigned to each vulnerability occurrence.

The vulnerability risk assessment system 200 also may include a vulnerability security score module 210. The vulnerability security score module 210 may combine the number of occurrences stored in the vulnerability occurrences database 206 with a severity, such as an average severity of the vulnerability occurrences, to determine the vulnerability security score. This score then provides an objective measure of the vulnerability of the computer technology based on historical performance of the computer technology and may be used to forecast future performance of the computer technology, or group of computer technologies.

Figure 3:
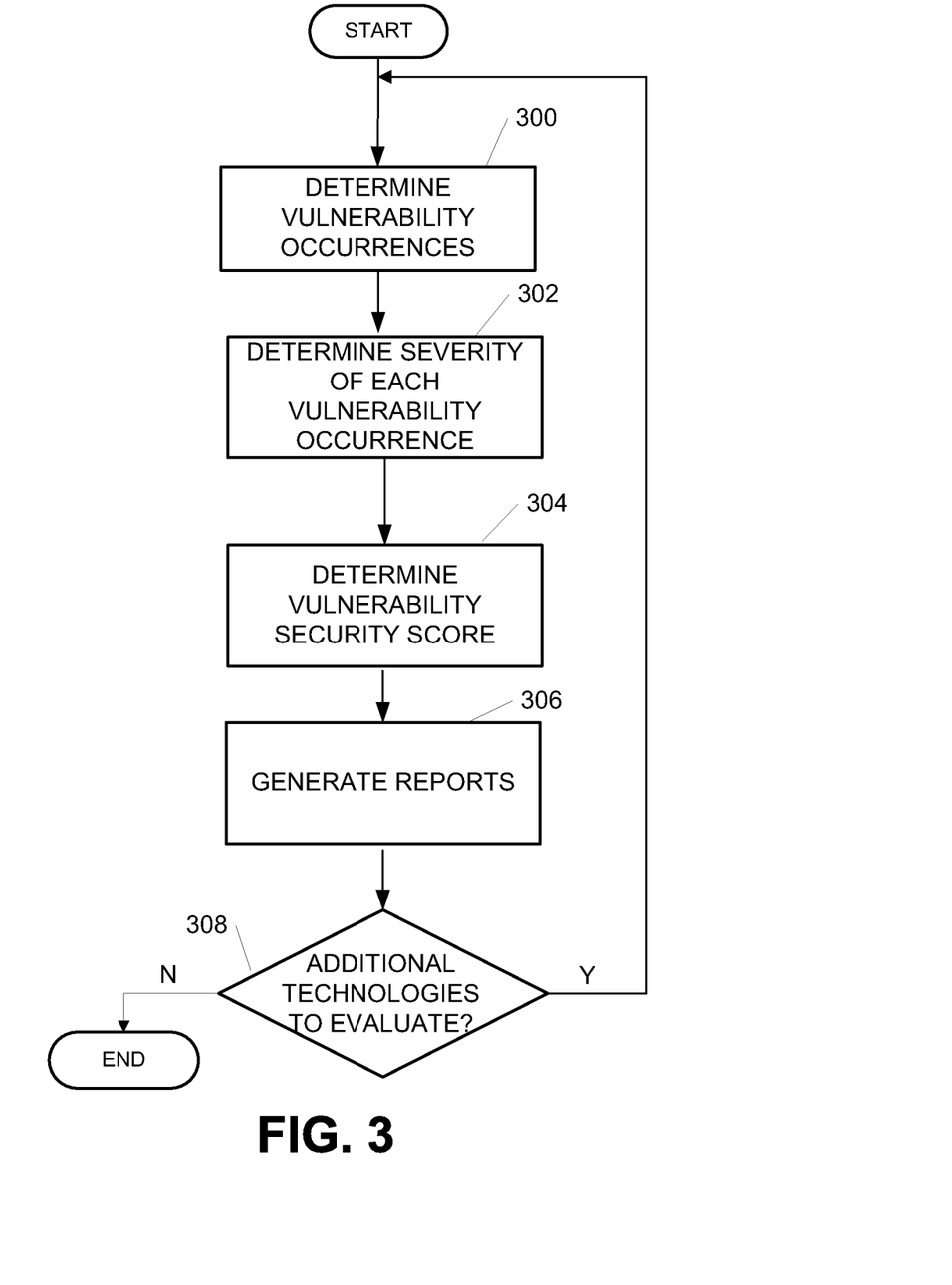
FIG. 3 is an example method of assessing vulnerability of one or more computer technologies in accordance with aspects described herein.

FIG. 3 illustrates one example method of evaluating vulnerability associated with a computer technology. In step 300, the vulnerability occurrences for a particular computer technology are identified. This identification may include determining a number of vulnerability occurrences over a predetermined period of time. The predetermined period of time may be a recent period, a predetermined historical period, the lifetime of the technology, and the like. Once the vulnerability occurrences have been identified, the severity of each vulnerability occurrence may be determined in step 302. The severity may be ranked on a scale of 1 to 10, 1 to 3, and the like.

In step 304, a vulnerability security score is determined for the computer technology. In some arrangements, the vulnerability security score may be determined by combining the number of vulnerability occurrences for the predetermined period of time with the average severity of the vulnerability occurrences. This process may include a multitude of vulnerabilities that have occurred for the computer technology being assessed. In one example, the number of vulnerability occurrences may be added to the average severity in order to obtain the vulnerability security score. In some arrangements, the vulnerability security scores for each occurrence may be predetermined and the scores may be aggregated over a predetermined period of time, e.g., the lifetime of the computer technology, in order to obtain an overall picture of that technology such that that technology may be compared to other technologies that have been similarly assessed. In step 306, various reports, and the like may be generated based on the vulnerability security score. These reports may include graphic representations of the historical vulnerability data, vulnerability security score for varying periods of time, versions of the computer technology, and the like.

In step 308 a determination is made as to whether there are additional computer technologies to assess. For instance, a user may assess various versions of a particular computer technology, various computer technologies providing similar functionality but developed by different companies (i.e., multiple word processing programs provided by different developers), and the like. If additional assessments are desired in step 308, the method will begin again at step 300 with the additional computer technology.

Evaluation of multiple computer technologies may provide various advantages. The vulnerability security score provides an objective measure of the overall vulnerability of a computer technology. In some conventional arrangements, risk or vulnerability associated with a computer technology is determined subjectively by an individual. The system and method described herein provides an objective measure of the risk associated with the computer technology based on historical performance of the computer technology. Comparisons may then be made between various computer technologies (e.g., computer technologies providing similar functions, such as various word processing computer technologies, different versions of a particular computer technology, and the like using this objective measure of risk. The results obtained from these comparisons may assist users, such as corporations, financial institution, and the like, in determining which computer technology to implement, which of the computer technologies they currently use should be eliminated, and the like.

Further, the systems and methods described herein may provide an objective measure such that, the same computer technology evaluated using the same criteria will obtain the same score. For instance, if two or more individuals are evaluating the same vulnerability occurrences for the same computer technology, they may all arrive at the same score if the same criteria for evaluation is being used. Conventional systems involving multiple individuals evaluating the same computer technology may result in substantially different assessments of risk.

Figure 4:
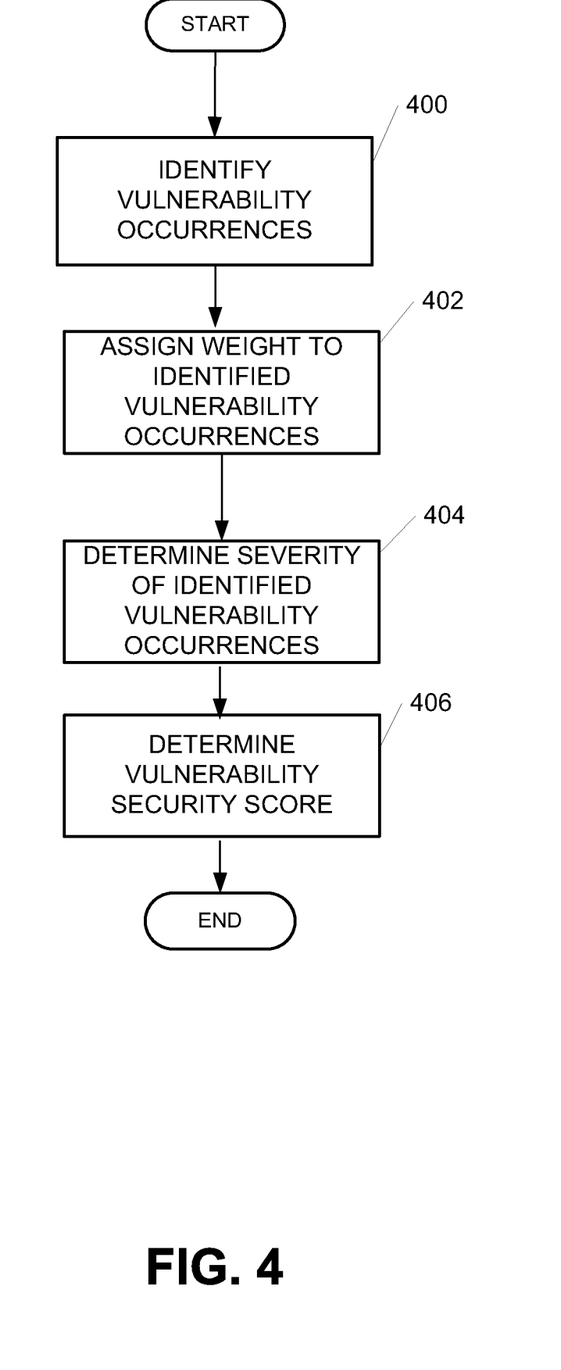
FIG. 4 is another example method of assessing vulnerability of a computer technology in accordance with aspects described herein.

FIG. 4 illustrates another example method of evaluating vulnerability associated with one or more computer technologies. In step 400, vulnerability occurrences for a computer technology are identified. As described above, the vulnerability occurrences may be identified from instances stored on the vulnerability assessment system or may be obtained from an outside source. In step 402 a weight may be assigned to the identified vulnerability occurrences. For instance, a user may determine various degrees of vulnerability occurrence in order to better rank each vulnerability occurrence. In some examples, the identified vulnerability occurrences may be weighted according to when the occurrence occurred. For instance, if the occurrence occurred within a recent period of time, such as within the previous three months, a higher weighted value may be given than for an occurrence that happened in the more distance past. In some arrangements, a lower weight may be assigned to occurrences from the initial three months of use of the computer technology to minimize the weight or importance of instances that occurred when the technology was newly developed and general issues were still being remedied. Other weighting arrangements may also be implemented.

In step 404 a severity of the identified vulnerability occurrences is determined. The severity may be determined using criteria, scale, and the like similar to the arrangement described above with respect to FIG. 3. In step 406 the vulnerability security score is determined using the weighted vulnerability occurrences and the severity. In some arrangements, the average severity may be used to determine the vulnerability security score. Various reports, and the like may be generated based on the determined vulnerability security score, identified vulnerability occurrences, determined severities, and the like.

In a similar arrangements, the technologies may be ranked by number of occurrences with the top portion (for instance, the top 1/3) being ranked highest (e.g., 1 on a scale of 1 to 3), the next portion (e.g., middle 1/3) being ranked slightly lower (e.g., 2 on a scale of 1 to 3) and the next portion (e.g., bottom 1/3) being given the lowest rank (e.g., 3 on a scale of 1 to 3). A similar ranking may then be performed for the severity. That is, technologies with the highest severity of vulnerabilities receive a ranking of 1, the next most severe receive a 2 and the least severe receive a 3. The two scores may be combined to determine an overall vulnerability for the particular technologies. Risk based decisions may then be made based on this objective information.

Figure 5A:
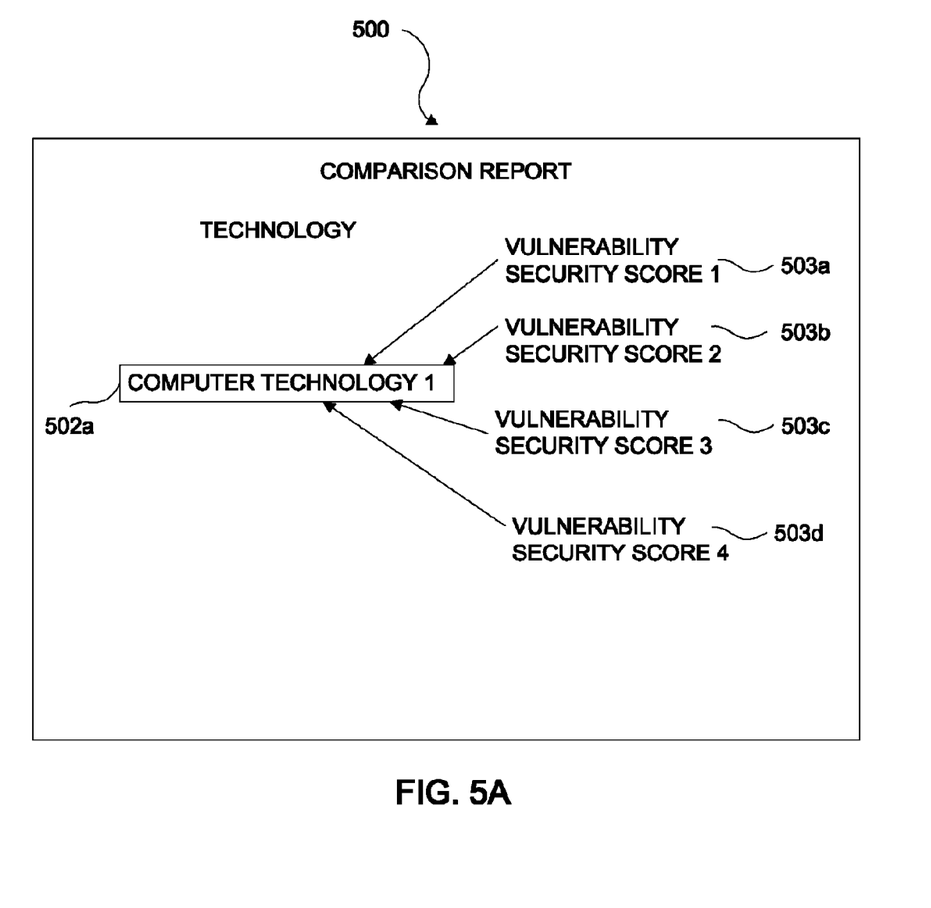
FIGS. 5A and 5B illustrate one example user interface showing the combination of all vulnerability scores for a given computer technology and one example user interface displaying a report generated using a vulnerability assessment system and method in accordance with aspects described herein.
Figure 5B:
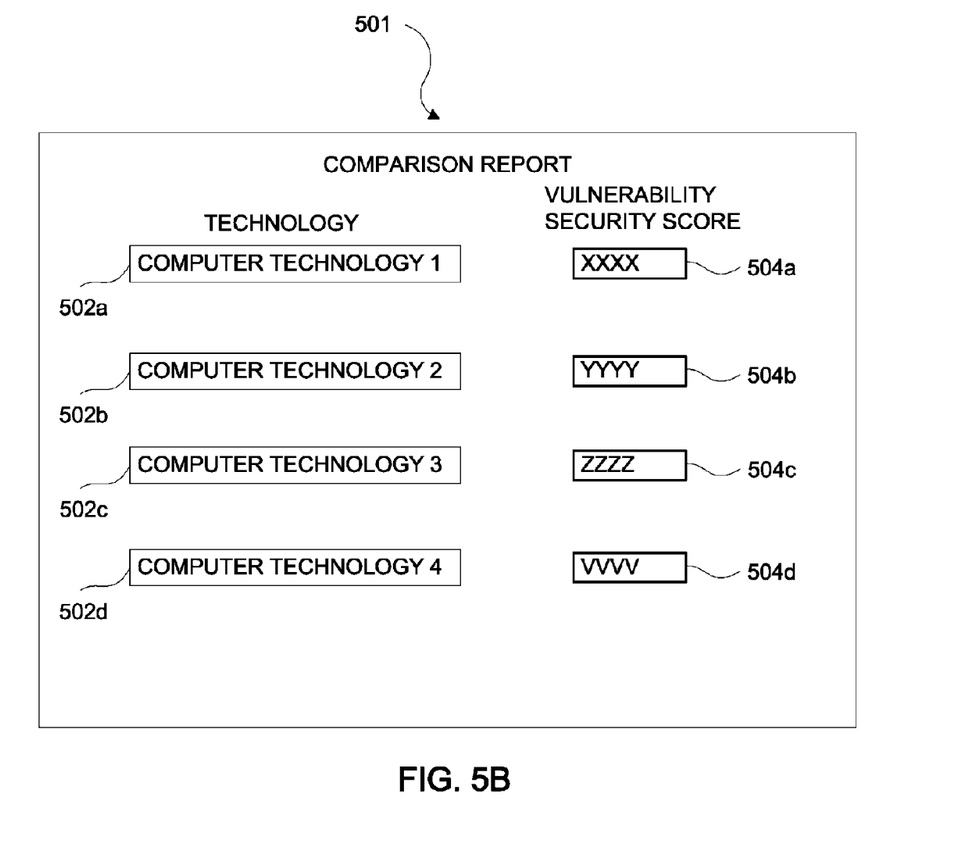

FIGS. 5A and 5B illustrate one example user interface showing the combination of all vulnerability scores for a given computer technology and one example user interface displaying a report generated using a vulnerability assessment system and method described herein. For instance, FIG. 5A illustrates one example user interface 500 that includes computer technology 502a. The computer technology has vulnerability security scores that are combined for that particular technology for a predetermined period of time, e.g., the lifetime of the computer technology. This process of aggregating the vulnerability security scores over a period of time is repeated for additional computer technologies. Once the data is assembled, FIG. 5B illustrates an example report that includes a listing of each computer technology assessed using the system and method in regions 502a-502d. In addition, a vulnerability security score 504a-504d for each computer technology 502a-502d is also listed. The vulnerability security score may be determined using one or more of the above described methods. The vulnerability security score reflected may be an aggregate of some or all vulnerabilities for that computer technology over a predefined period of time. The report 501 illustrated in FIG. 5 provides a user with the ability to view vulnerability security scores for various computer technologies and compare the scores. In some arrangements, the computer technologies listed may be various versions of the same software. In other arrangements, the computer technologies listed may be software providing various functionality but all from the same developer. In still other arrangements, the computer technologies listed and assessed may be various software programs providing the same or similar functionality but provided by different developers. In still other arrangements, the computer technologies may be unrelated and have differing functionality. The objective measure provided by the vulnerability security score permits these comparisons to be made and the outcome of the comparisons may be used to predict risk or vulnerability associated with future use of one or more computer technologies, which computer technology to implement, which to eliminate, and the like.

Figure 6:
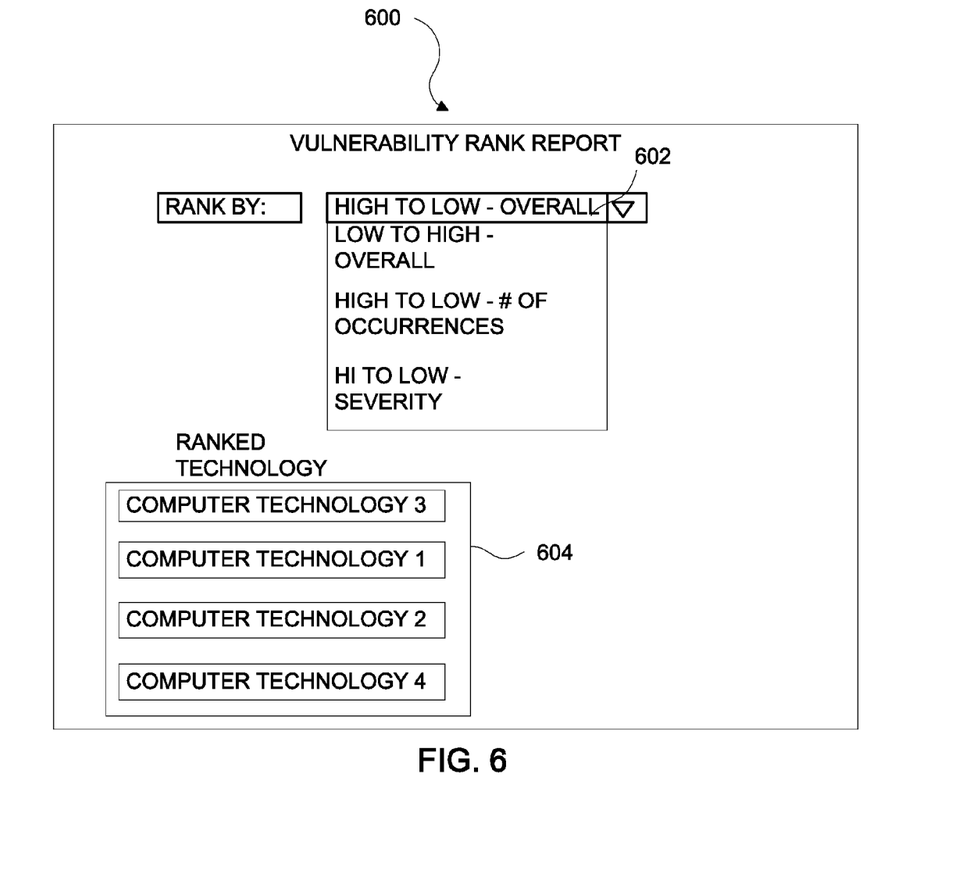
FIG. 6 illustrates another example user interface for generating another example report of vulnerability of a computer technology using the system and method of assessing vulnerability of a computer technology in accordance with aspects described herein.

FIG. 6 illustrates yet another user interface 600 in which the assessed computer technologies may be ranked based on various factors. For instance, in field 602 the assessed computer technologies may be ranked from highest to lowest overall. That is, the technologies may be listed from highest risk to lowest risk based on the vulnerability security score. The computer technologies may also be listed from lowest risk to highest risk. In still other arrangements the assessed computer technologies may be ranked from highest risk to lowest risk based on the number of vulnerability occurrences for that computer technology. The number of occurrences may be from the lifetime of the technology or over another predetermined period of time. In still other arrangements the computer technologies may be ranked from highest risk to lowest risk based on the severity of the vulnerability occurrences. Once the ranking criteria is selected in field 602, the assessed computer technologies may be displayed in rank order in field 604.

Figure 7:
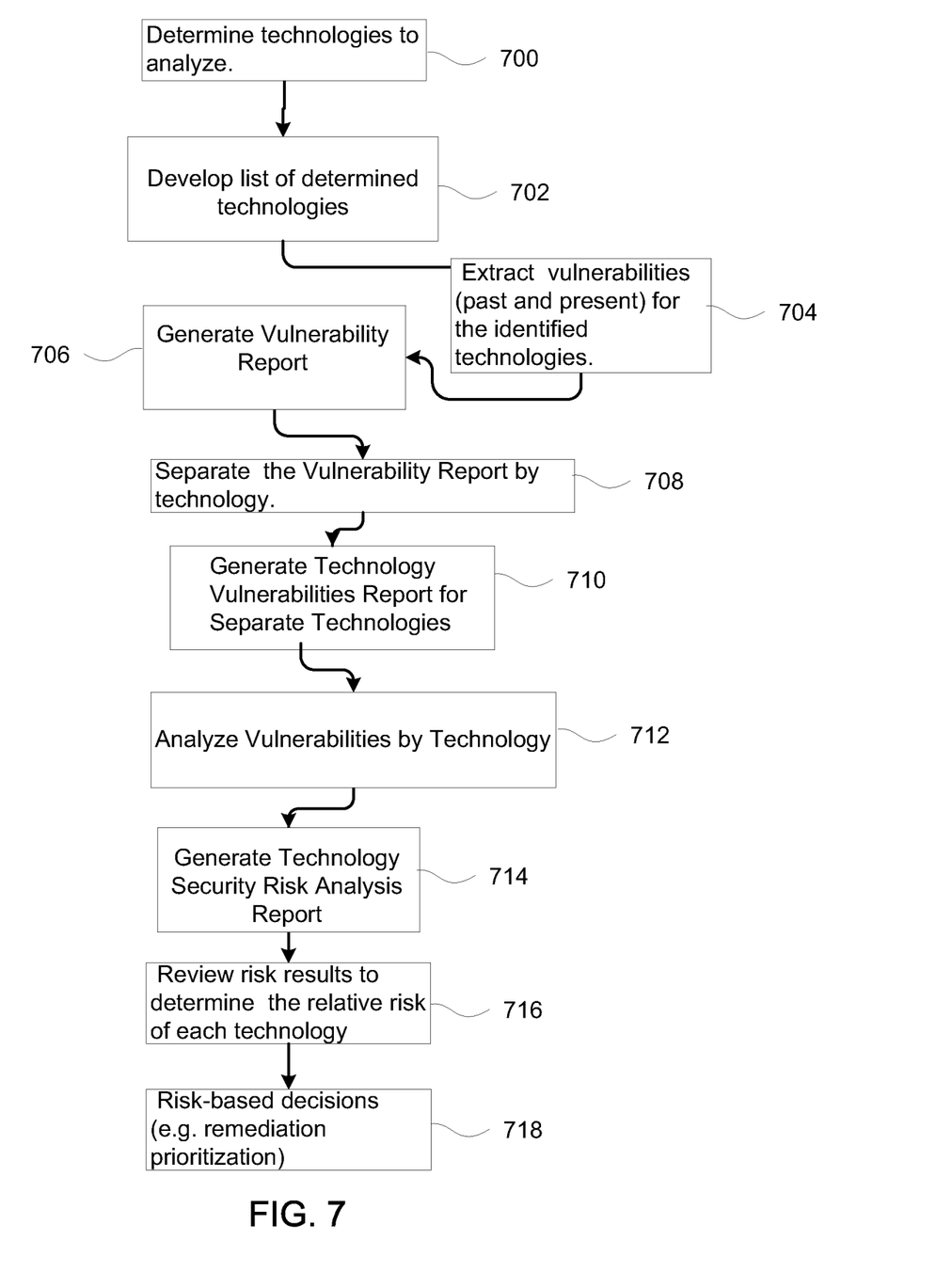
FIG. 7 illustrates still another example method of assessing vulnerability of a computer technology in accordance with aspects described herein.

FIG. 7 illustrates another example method of assessing vulnerability of a computer technology. In step 700 various computer technologies to assess are determined. In some arrangements, some or all of the computer technologies being used by an organization, such as a business, may be evaluated. In other arrangements, computer technologies that an organization is considering implementing may be assessed. In step 702 a list of the technologies to assess is developed. In step 704, vulnerability occurrences for the listed technologies are identified and extracted. In step 706, a vulnerability report is generated include vulnerabilities for all listed technologies. In step 708, the generated vulnerability report is separated according to each technology assessed. Individual reports for each technology are generated in step 710. In step 712, the vulnerabilities are analyzed for each technology based on the generated reports. An overall technology risk analysis report is generated in step 714 and the relative risk of each technology is evaluated in step 716. In step 718, various decisions regarding the listed technologies are made based on the assessed risk.

Figure 8:
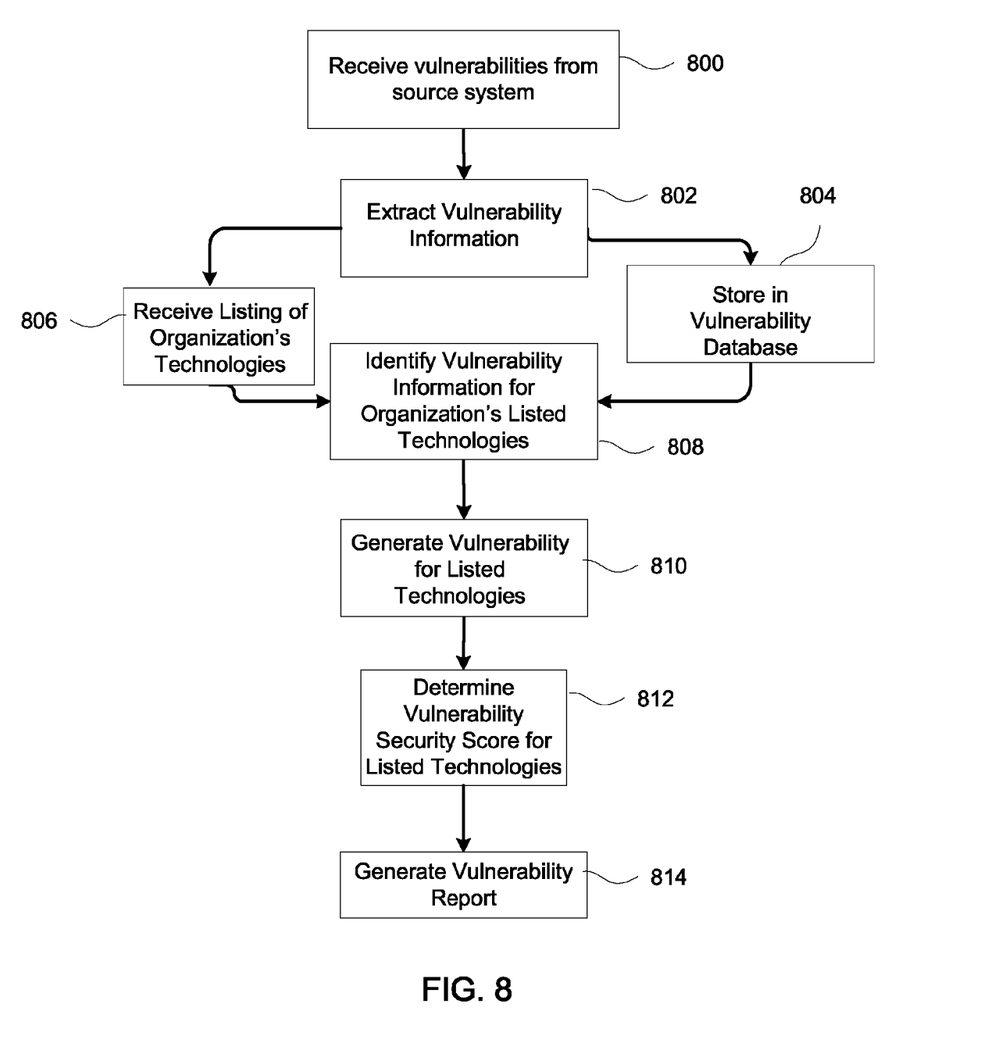
FIG. 8 illustrates yet another example method of assessing vulnerability of a computer technology in accordance with aspects described herein.

FIG. 8 illustrates yet another example method of assessing vulnerability of a computer technology. In step 800, vulnerabilities for available computer technologies is received. In some arrangements, the vulnerabilities may be obtained from an outside source and downloaded to the vulnerability assessment system. In step 802 the vulnerability information or data is extracted from the vulnerabilities received and are stored in step 804. In step 806 a listing of computer technologies associated with our used by the user organization is received. In step 808, extracted vulnerability data is compared to the listing of computer technologies and vulnerability information for the listed technologies is identified. In step 810 a vulnerability for the listed technologies is determined, for example, as described in the methods illustrated in FIGS. 3 and 4. In step 812 a vulnerability security score is generated for the listed technologies and in step 814 a vulnerability report may be generated.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method of determining risk associated with a computer technology, comprising:
    identifying, by a computing device, a plurality of vulnerability occurrences associated with the computer technology;
    determining, by the computing device, a number of vulnerability occurrences of the plurality of vulnerability occurrences associated with the computer technology over a predetermined period of time;
    assigning, by the computing device, a weighted value to each of the determined vulnerability occurrences to determine a weighted vulnerability occurrence score, wherein the weighted value corresponds to a time period within the predetermined time period that each of the determined vulnerability occurrences occurred, wherein a weight of the weighted value assigned to the determined vulnerability occurrences is higher for vulnerability occurrences that occur in a first time period and lower for vulnerability occurrences that occur in a second time period;
    determining, by the computing device, a severity of each of the determined vulnerability occurrences associated with the computer technology;
    determining, by the computing device, an average severity for the determined vulnerability occurrences associated with the computer technology;
    combining, by the computing device, the weighted vulnerability occurrence score with the determined average severity to determine a vulnerability security score for the computer technology; and
    comparing, by the computing device, the determined vulnerability security score with determined vulnerability security scores for another computer technology for the predetermined period of time.

2. The method of claim 1, further including determining future vulnerability potential of the computer technology based on the determined vulnerability security score.

3. The method of claim 1, wherein the predetermined period of time is a lifetime of the computer technology.

4. The method of claim 1, further including generating reports based on the determined vulnerability security score of the computer technology.

5. The method of claim 1, further including repeating the method for a second computer technology, the second computer technology being in a category with the computer technology.

6. The method of claim 5, wherein the category is at least one of type of computer technology, developer of the computer technology and version of the computer technology.

7. The method of claim 1, further comprising:
ranking the computer technology by the determined number of vulnerability occurrences over the predetermined time period.

8. The method of claim 1, further comprising:
ranking the computer technology by the determined severity of the vulnerability occurrences.

9. A method of determining risk associated with a computer technology, comprising:
receiving, by a computing device, a listing of vulnerability occurrences associated with the computer technology;
assigning, by the computing device, a weighted value to each of the received vulnerability occurrences to determine a weighted vulnerability occurrence score, wherein the weighted value corresponds to a time period that each of the received vulnerability occurrences occurred, wherein a weight of the weighted value assigned to the determined vulnerability occurrences is higher for vulnerability occurrences that occur in a first time period and lower for vulnerability occurrences that occur in a second time period;
determining, by the computing device, a severity of each of the vulnerability occurrences associated with the computer technology;
determining, by the computing device, an average severity for the vulnerability occurrences associated with the computer technology;
combining, by the computing device, the determined average severity with the weighted vulnerability occurrence score;
determining, by the computing device, a vulnerability security score for the computer technology based on the combined determined average severity and weighted vulnerability occurrence score; and
comparing, by the computing device, the determined vulnerability security score with determined vulnerability security scores for another computer technology.

10. The method of claim 9, further including determining a future risk of vulnerability associated with the computer technology based on the determined vulnerability security score.

11. The method of claim 9, wherein the received listing of vulnerability occurrences is a listing of vulnerability occurrences over a predetermined period of time.

12. The method of claim 11, wherein the predetermined period of time is a lifetime of the computer technology.

13. The method of claim 9, further including generating reports based on the determined vulnerability security score of the computer technology.

14. The method of claim 9, further including repeating the method for a second computer technology, the second computer technology being in a category with the computer technology.

15. The method of claim 14, wherein the category is at least one of type of computer technology, developer of the computer technology and version of the computer technology.

16. One or more non-transitory computer-readable media storing computer readable instructions that, when executed, cause a processor to perform a method, comprising:
identifying a plurality of vulnerability occurrences associated with the computer technology;
determining a number of vulnerability occurrences of the plurality of vulnerability occurrences associated with the computer technology over a predetermined period of time;
assigning a weighted value to each of the determined vulnerability occurrences to determine a weighted vulnerability occurrence score, wherein the weighted value corresponds to a time period within the predetermined period of time that each of the determined vulnerability occurrences occurred, wherein a weight of the weighted value assigned to the determined vulnerability occurrences is higher for vulnerability occurrences that occur in a first time period and lower for vulnerability occurrences that occur in a second time period;
determining a severity of each of the determined vulnerability occurrences associated with the computer technology;
determining an average severity for the determined vulnerability occurrences associated with the computer technology;
combining the weighted vulnerability occurrence score with the determined average severity to determine a vulnerability security score for the computer technology; and
comparing the determined vulnerability security score with determined vulnerability security scores for another computer technology for the predetermined period of time.

17. The one or more non-transitory computer-readable media of claim 16, the method further including determining future vulnerability potential of the computer technology based on the determined vulnerability security score.

18. The one or more non-transitory computer-readable media of claim 16, wherein the predetermined period of time is a lifetime of the computer technology.

19. The one or more non-transitory computer-readable media of claim 16, the method further including generating reports based on the determined vulnerability security score of the computer technology.

20. The one or more non-transitory computer-readable media of claim 16, the method further including repeating the method for a second computer technology, the second computer technology being in a category with the computer technology.

21. The one or more non-transitory computer-readable media of claim 20, wherein the category is at least one of type of computer technology, developer of the computer technology and version of the computer technology.

* * * * *